United States Patent
Zhai et al.

(10) Patent No.: US 9,066,318 B2
(45) Date of Patent: Jun. 23, 2015

(54) TECHNIQUES FOR ENABLING COMPATIBILITY OF ULTRA WIDEBAND DEVICES

(75) Inventors: Hongqiang Zhai, Ossining, NY (US); Richard Chen, Croton-on-Hudson, NY (US); Chun-Ting Chou, Taipei (TW)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 420 days.

(21) Appl. No.: 13/056,473

(22) PCT Filed: Jul. 8, 2009

(86) PCT No.: PCT/IB2009/052979
§ 371 (c)(1),
(2), (4) Date: Jan. 28, 2011

(87) PCT Pub. No.: WO2010/013155
PCT Pub. Date: Feb. 4, 2010

(65) Prior Publication Data
US 2011/0176580 A1     Jul. 21, 2011

Related U.S. Application Data

(60) Provisional application No. 61/084,711, filed on Jul. 30, 2008.

(51) Int. Cl.
*H04W 72/02* (2009.01)
*H04W 88/06* (2009.01)
*H04W 84/18* (2009.01)

(52) U.S. Cl.
CPC .............. *H04W 72/02* (2013.01); *H04W 88/06* (2013.01); *H04W 84/18* (2013.01)

(58) Field of Classification Search
CPC ......... H04W 4/24; H04W 4/26; H04W 4/001; H04W 28/02; H04W 8/02; H04W 88/06; H04W 16/14
USPC ........... 370/338, 332, 337; 709/220; 348/732; 455/434, 454
See application file for complete search history.

(56) References Cited

U.S. PATENT DOCUMENTS

| 7,233,804 B2 | 6/2007 | Sugaya | |
| 2005/0198221 A1* | 9/2005 | Manchester et al. | 709/220 |
| 2006/0030318 A1 | 2/2006 | Moore | |
| 2006/0084444 A1 | 4/2006 | Kossi | |

(Continued)

OTHER PUBLICATIONS

Chia-Chin Chong, "Potential of UWB Technology for the Next Generation Wireless Communications". 2006.*

(Continued)

*Primary Examiner* — Un C Cho
*Assistant Examiner* — Oussama Roudani
(74) *Attorney, Agent, or Firm* — Larry Liberchuk (57) ABSTRACT

A method (200) for enabling compatibility of wireless devices having different regulation settings. The method includes upon initialization of a wireless device, scanning a predefined common channel (S220); forming a WiNet service set (WSS) by wireless devices communicating over the predefined common channel (S230); upon switching of the wireless devices in the WSS to a channel other than the predefined common channel, checking if a new wireless device attempts to join the WSS (S240, S250); and adding the new wireless device to the WSS if such attempt was detected (S290).

12 Claims, 6 Drawing Sheets

(56) References Cited

U.S. PATENT DOCUMENTS

2007/0042795 A1  2/2007  Mo
2007/0222900 A1* 9/2007  Yamaguchi et al. .......... 348/732

OTHER PUBLICATIONS

IEEE Standard 802.15.2 "Part 15.2: Coexistence of Wireless Personal Area Networks with Other Wireless Devices Operating in Unlicensed Frequency Bands" Aug. 8, 2003.*
Zhao, coexistence of beacon-enabled and nonbeacon-enabled pan, Aug. 2008.*

Dong-Hwan Park et al: "Design and Implementation of QoS Guaranteed Bridge System for High Speed PLC and UWB", Consumer Electronics, 2007. ISCE 2007, IEEE International Symposium on, IEEE, PI, Jun. 1, 2007, pp. 1-6, XP031160359.
Mahmud S et al: "Meshed high data rate personal area networks", IEEE Communications Surveys, IEEE, New York, NY, US, vol. 10, No. 1, Jan. 1, 2008, pp. 58-69, XP011226093.
Jeyhan Karaoguzkaraoguz: "High-Rate Wireless Personal Area Networks", IEEE Communications Magazine, IEEE Service Center, Piscataway, US, vol. 39, No. 12, Dec. 1, 2001, pp. 96-102, XP011091866.

* cited by examiner

TECHNIQUES FOR ENABLING COMPATIBILITY OF ULTRA WIDEBAND DEVICES

This application claims the benefit of U.S. Provisional Application No. 61/084,711 filed on Jul. 30, 2008.

The invention generally relates to wireless media (WiMedia) networks and, more particularly, to techniques for enabling compatibility of ultra-wideband (UWB) devices in such networks.

The WiMedia specification for ultra-wideband (UWB) networks defines a fully distributed medium access control (MAC) protocol for wireless personal area networks (WPANs). Due to regulatory restrictions in different regions the frequency bands in which UWB devices can operate are different. For example, Europe, Japan and the USA provision different frequency bands in which UWB devices can communicate. A UWB device is a device with a UWB transceiver such as, for example, a camera, a laptop, a wireless display, a wireless monitor or TV, a wireless external hard drive, a wireless printer, and the like.

Figure 1:
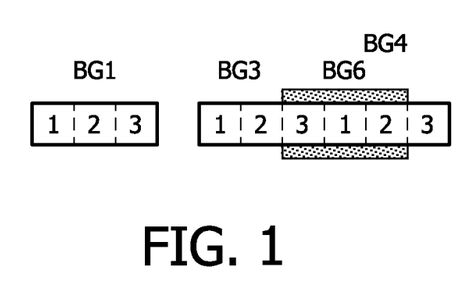
FIG. 1 is a schematic diagram illustrating band groups used by UWB devices.

FIG. 1 shows three frequency band groups (BG) which can be used by UWB devices in different regions. Each such band group consists of three frequency bands or three fixed frequency interleave (FFI) channels ("channel"). The band groups BG1, BG3, and BG4 are defined in the WiMedia specification having frequency ranges of 3.16 GHz-4.752 GHz, 6.336 GHz-7.920 GHz, and 7.920 GHz-9.504 GHz, respectively. The band group BG6 reuses some bands in BG3 and BG4 and has the frequency range of 7.392 GHz-8.976 GHz.

Currently, only channel '3' in the BG3 can be commonly used by UWB devices set according to regulation requirements of Europe, Japan and the USA. Ongoing regulation discussions may also approve the use of channel '3' in the band group BG1 as a common channel in these regions. Europe may only allow using BG3 and some bands in BG4. Japan and Korea may only allow using BG4 and some bands in BG3. The USA may allow using all band groups. An UWB device may only support some bands allowed in its geographic region.

The current regulatory restrictions limit the compatibility of UWB devices, such that devices produced to operate in a certain local region may only communicate in band groups supported by this local region. That is, UWB devices from different regions can communicate and/or establish a network when the devices operate in the same area. This is a major disadvantage as it limits the usage of UWB devices by, for example, international travels.

In addition, early versions of UWB devices support only one band group, whereas newly developed devices are adapted to operate in multiple band groups. Thus, there is a compatibility problem between new and old versions of UWB devices. An example for this compatibility problem is when two wireless network (WiNet) service sets (WSSs) try to form a single WSS. However, devices in the WSS cannot find each other because they operate at different channels. A WSS is a named group of devices that share a security relationship. A WSS is designed to easily form secure ad hoc networks where devices can discover each other and form securely encrypted links.

Therefore, it would be advantageous to provide a solution to resolve the incompatibility problems of UWB devices.

Certain embodiments of the invention include a method for enabling compatibility of wireless devices having different regulation settings. The method comprises upon initialization of a wireless device, scanning a predefined common channel; forming a WiNet service set (WSS) by wireless devices communicating over the predefined common channel; upon switching of the wireless devices in the WSS to a channel other than the predefined common channel, checking if a new wireless device attempts to join the WSS; and adding the new wireless device to the WSS if such attempt was detected.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments disclosed by the invention are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with the principles of the invention a common channel (or band) in one of the band groups is utilized to coordinate UWB devices from different regions to communicate with each other. The UWB devices can form a network (or a WSS) on the common channel. Alternatively, the UWB device can switch to a channel (other than the common channel) supported by all the devices in the formed network. As will be described in detail below, in such case one of the UWB devices is required to send control information on the common channel if more devices are expected to join the network.

Figure 2:
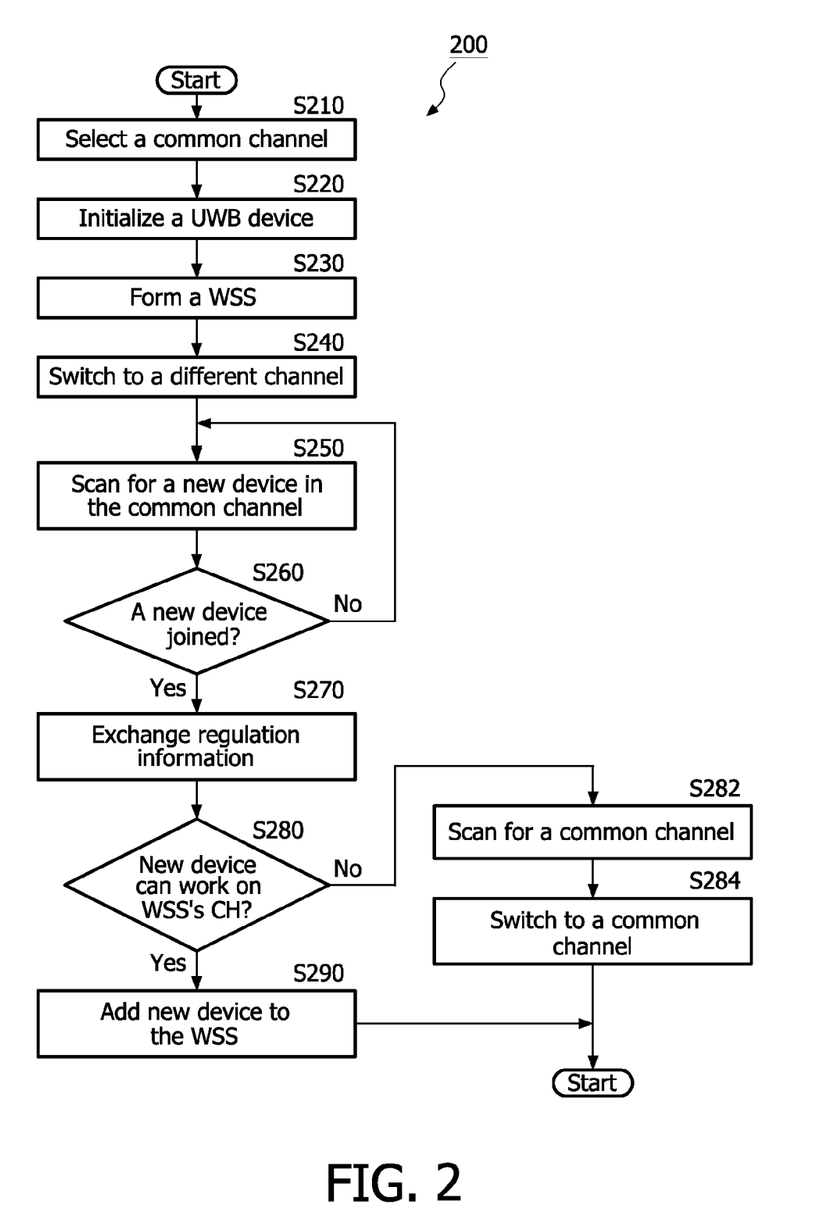
FIG. 2 is a flowchart describing a method for enabling compatibility of UWB devices implemented in accordance with an embodiment of the invention.

FIG. 2 shows an exemplary flowchart 200 describing the method for enabling compatibility of UWB devices implemented in accordance with certain embodiments of the invention. At S210, a common channel in one of the band groups is selected. The common channel is being available according to all regulations of different regions. In one embodiment of the invention the common channel is channel number '3' in either band groups BG1 or BG3. At S220, when a UWB is initialized (typically as the device is powered up), all channels supported by the device are scanned. If the device detects a targeted WSS on one of the channels which is not the common channel, the device joins the WSS on that channel. Otherwise, the device scans the common channel. The device scans the common channel for a duration of a number of N superframes (where N is an integer number equal to or greater than 1) or for a length ($T_{sup}$) of a superframe. A superframe is a data structure utilized by UWB devices to communicate with each other. A superframe typically includes a beacon period (BP), during which devices transmit their beacons and a data transmission period (DP). If, while scanning the common channel, the device finds a beacon group, the device joins the group;

otherwise, the device forms a new beacon group. A beacon group consists of a group of devices that share the same channel.

Figure 3:
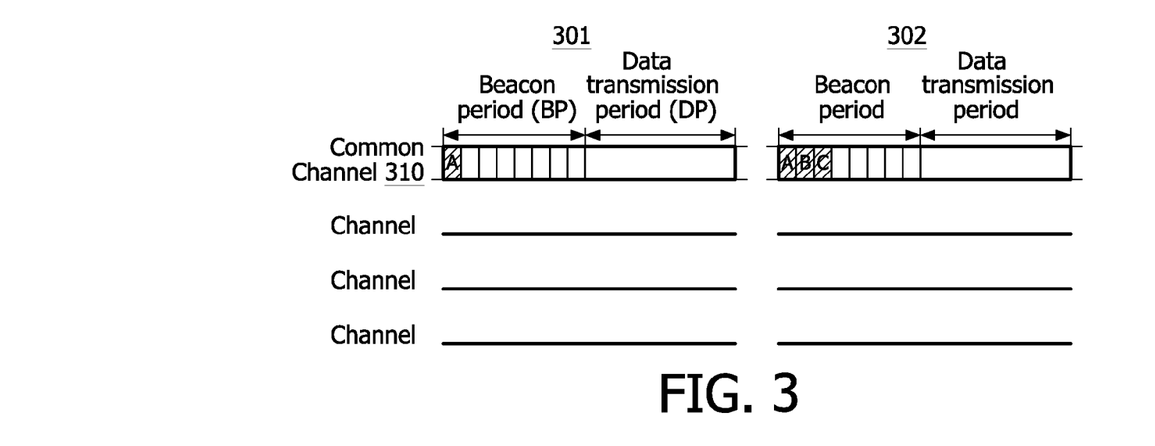
FIG. 3 is a diagram illustrating an initialization procedure.

The initialization step (S220) is further illustrated in FIG. 3, where a superframe 301 is transmitted over a common channel 310. As the UWB device "A" powers up, it transmits a beacon during the beacon period. Thereafter, devices "B" and "C", while scanning the common channel 310, detect the beacon group formed by the device "A", and join its beacon group (see superframe 302).

Figure 4:
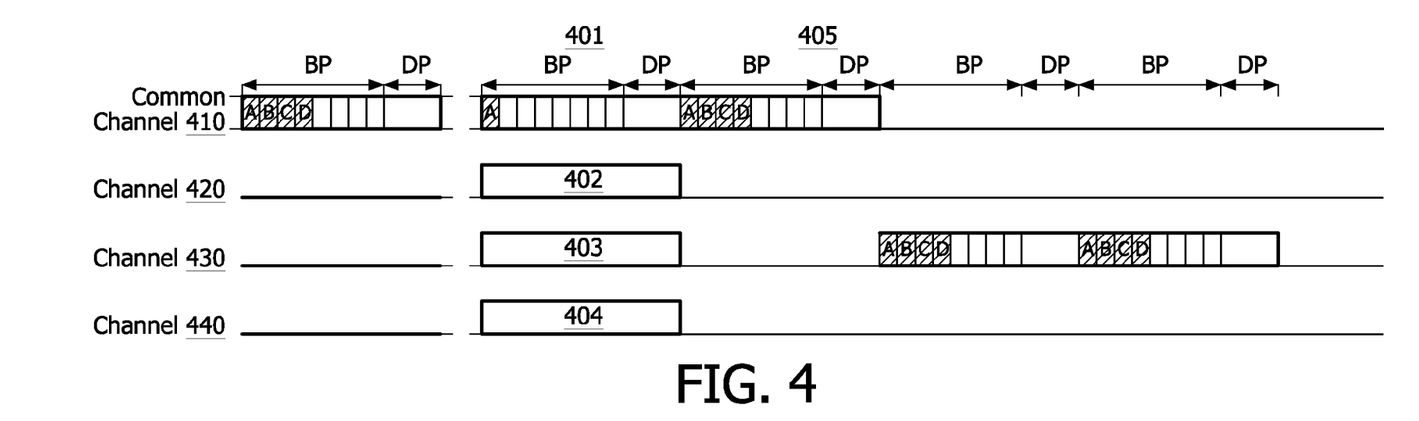
FIG. 4 is a diagram illustrating a procedure when devices switch to a channel which is not a common channel.

Returning to FIG. 2, at S230 a WSS is formed. Specifically, to form a WSS, by devices communicating on the common channel, the devices first exchange regulation information about the allowable band groups and determine a set of common allowable channels. Then, the devices scan the set of common allowable channels and "logical channels" operating thereon to detect a channel or a logical channel over which the devices can form a WSS. Logical channels are defined by using up to ten different time-frequency codes for each band group. In addition, the UWB devices may switch to another channel which is not the common channel. This option is illustrated in FIG. 4, where a WSS including devices "A", "B", "C", and "D" is formed to operate on a common channel 410, as represented by a superframe 401 having devices "A", "B", "C", and "D" as part of the beacon group. Subsequently, devices "A", "B", "C", and "D" respectively scan channels 410, 420, 430, and 440 by transmitting superframes 401, 402, 403, and 404 in these channels. The superframe 405 is utilized to exchange control information between the devices, and based on this information the devices decide to switch to the channel 430.

It should be noted that a device can be selected to scan all bands and logical channels in the common set of channels one-by-one through multiple superframes. In addition, as illustrated in FIG. 4, devices can also coordinate to scan multiple channels simultaneously, thereby saving at least in scanning time. Once a WSS is formed, devices in the WSS can communicate with each other on the WSS's channel.

Figure 5:
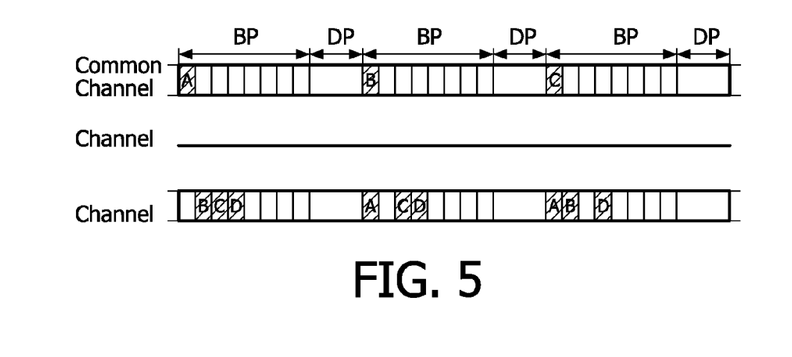
FIG. 5 is a diagram illustrating a beaconing procedure after the WSS switches to a band.

New UWB devices may try to join the WSS, typically when the devices in the WSS switch to a different channel. A device attempting to join the WSS scans the common channel. Referring back to FIG. 2, at S240 the devices in the WSS switch to a different channel and may do so in order, for example, to communicate on a channel having more resources and/or bandwidth. At S250, a single device in the WSS is selected to periodically transmit beacons in the common channel. The chosen device transmits a beacon and listens in the channel to detect a superframe transmitted by a new device attempting to join the WSS. The device listens in the common channel every M superframes, where M is an integer number smaller than the number of superframes "N" defined above. In one embodiment, only a single designated device is utilized to transmit beacons in the common channel. Alternatively, as illustrated in FIG. 5, all devices in the WSS may take turns to perform this task.

At S260, it is checked if a new device attempting to join the WSS was detected, and if so, execution continues with S270; otherwise, execution returns to S250. At S270, regulation information about allowable band groups is exchanged between a "scanning device" (i.e., the device transmitting the beacons on the common channel) and the new device. When the scanning device switches back to the channel which the WSS operates on, the regulation information of the new device is delivered to devices in the WSS. At S280, it is determined whether the new devices and the WSS devices can communicate on the channel that is currently used by the WSS. If so, at S290, the new device joins the WSS; otherwise at S282, the new device and WSS devices coordinate to scan the common set of channels until a usable channel is found. Thereafter, at S284, the WSS devices and the new device switch to the detected usable channel, and the new device is added to the WSS. At S290, the new device joins the WSS so that all devices can communicate with each other. It should be noted that in a preferred embodiment of the invention, the new device is a "foreign" device, i.e., a device with regulation settings of a region different than the region in which the WSS and its devices operate.

Figure 6:
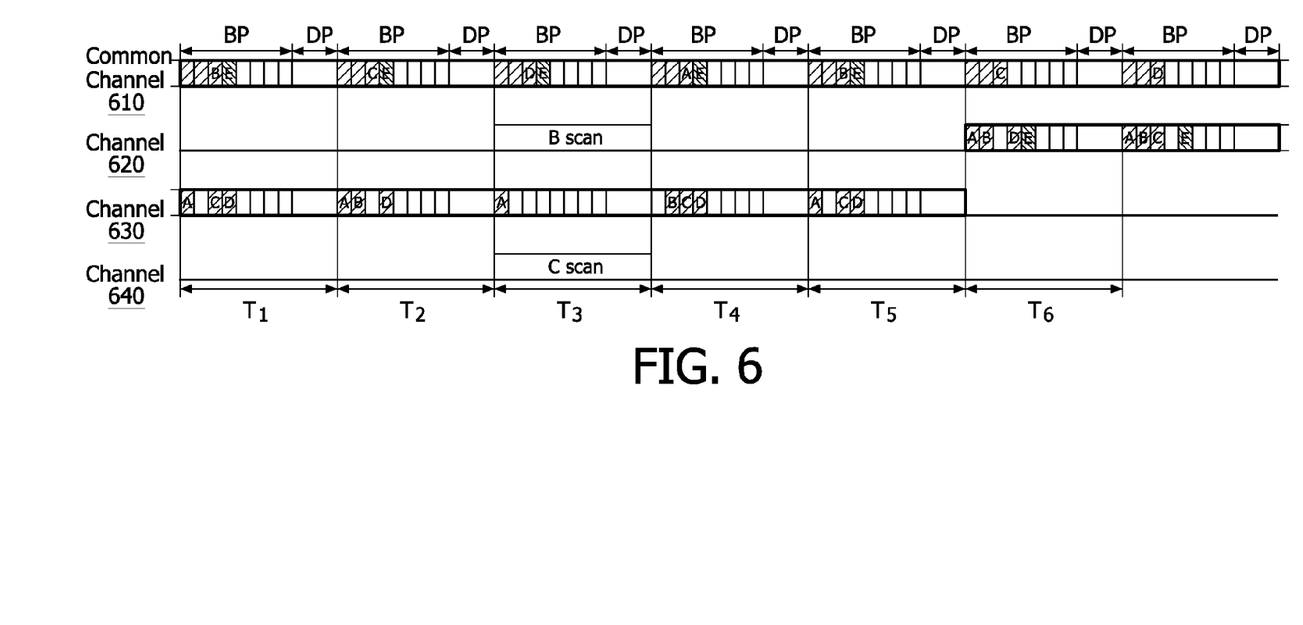
FIG. 6 is a diagram illustrating a procedure for joining a new device in a WSS.

FIG. 6 provides an example for the process of joining a new device "E" to a WSS including devices "A", "B", "C", and "D". During time $T_1$, the device "E" transmits a beacon in a common channel 610, while a device "B" scans this channel. During time $T_2$, the device "B" exchanges regulation information with the other devices in the WSS to agree on a common set of channels. During time $T_3$, the devices "A", "B", "C", and "D" scan a common set of channels including channels 610, 620, 630, and 640. Thereafter, at times $T_4$ and $T_5$, the devices in the WSS exchange information about a new channel on which the devices can operate and further exchange this information with the new device "E". At time $T_6$, the devices switch to a channel 620 on which the devices "A", "B", "C", "D", and "E" can communicate with each other.

In accordance with another embodiment of the invention a method for allowing two or more WSSs operating on different channels/bands to form a single WSS is disclosed. With this aim, devices from the two WSSs are selected to detect each other on the common band and exchange regulation information to find a common channel/band in which the two devices can operate. In addition, each device delivers the regulation information of the other device to devices in its WSS. Thereafter, the devices in the two WSSs switch to a common band to form a single WSS.

Figure 7A:
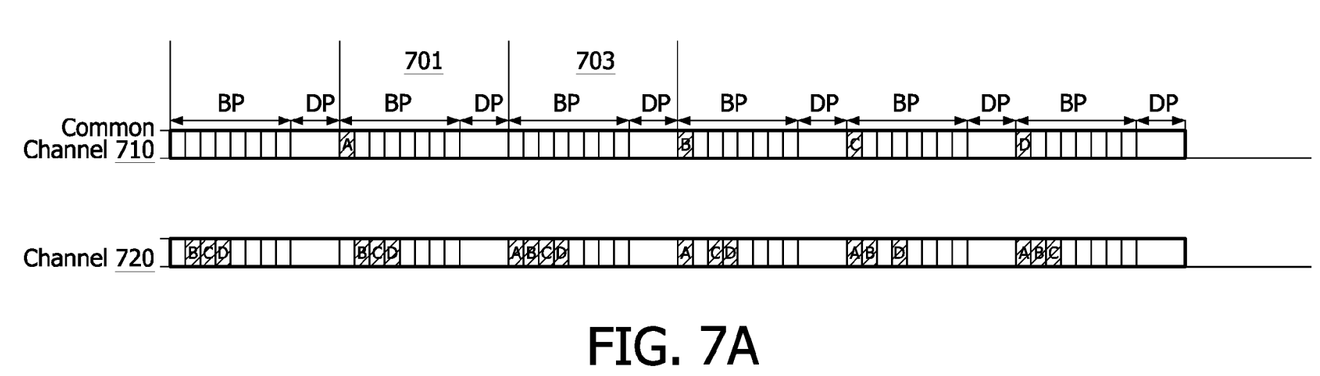
FIGS. 7A, 7B, and 7C are diagrams illustrating various options for re-enabling devices to join a WSS.
Figure 7B:
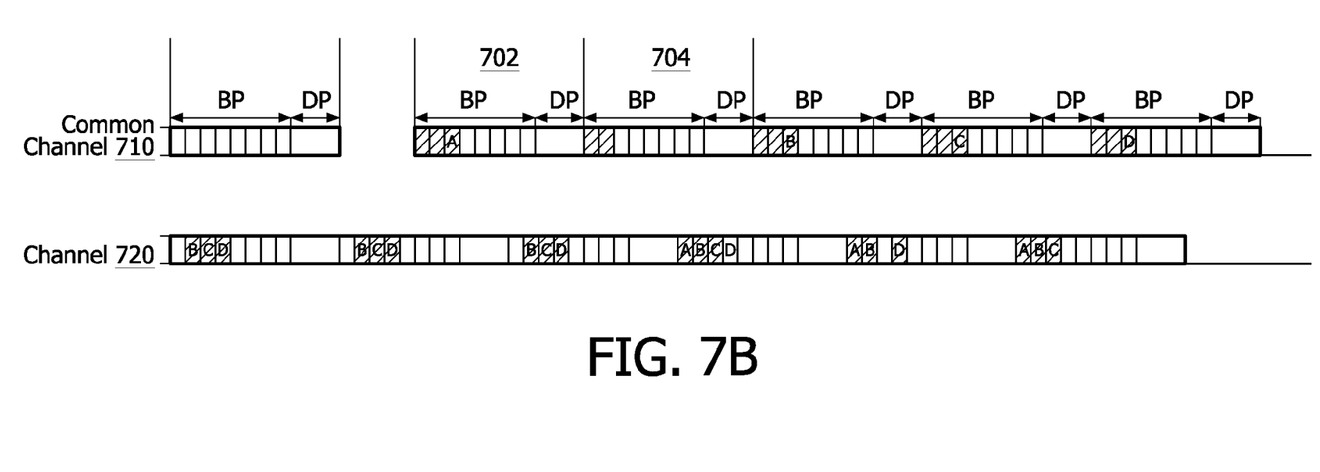
Figure 7C:
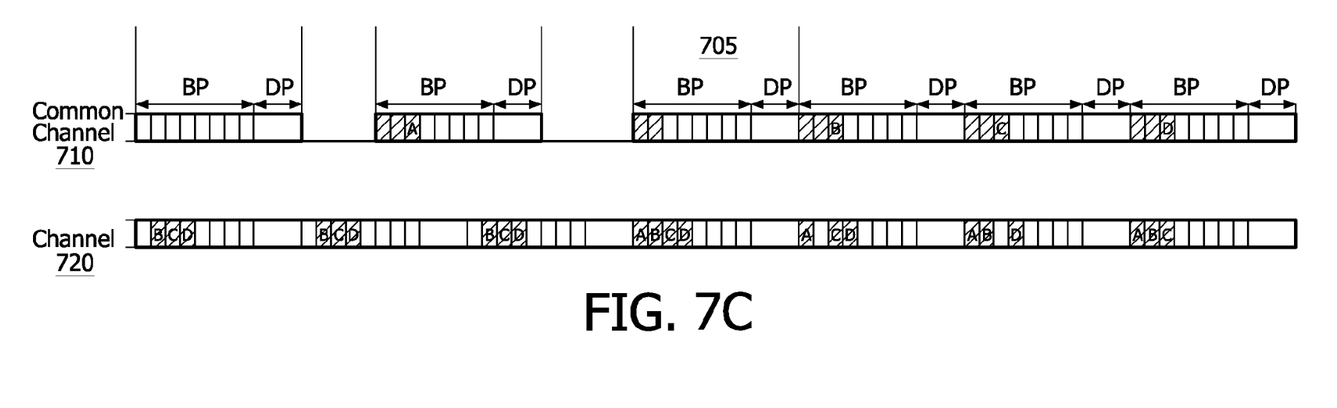

In accordance with another embodiment of the invention the WSS may be explicitly set to allow other devices or WSS to join the WSS when such an option was previously blocked. Enabling the WSS to operate in such mode may be performed, for example, through a command generated by means of a graphical user interface or a physical interface (e.g., a button) of a device in the WSS. In this embodiment, as schematically illustrated in FIG. 7A, a device ("A") in the WSS is selected to scan a common channel 710. If there is no beacon group on the common channel 710, the device starts a beacon group (superframe 701). Otherwise, as shown in FIG. 7B, the device ("A") joins the existing beacon group (superframe 702). The device then skips a superframe (e.g., superframes 703 and 704) on the common channel 710 and returns to its own WSS to exchange beacon group information with other device(s). Thereafter, the devices in the WSS can take turns in transmitting beacons and monitoring superframes on the common channel 710. In another embodiment, illustrated in FIG. 7C, the beacon period of superframes transmitted on the common channel 710 is synchronized with the beacon period of superframes transmitted on the channel 720 on which the WSS devices communicate. The beacon periods are synchronized once the information is exchanged using a superframe 705 between the joining device "A" and the WSS device.

The disclosed method can be implemented in communication systems including, but not limited to, UWB based WPANs, WiMedia based wireless networks and WPANs, or any time division multiple access (TDMA) or super-frame based wireless networks.

The principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

We claim:

1. A method for enabling compatibility of communications between two or more wireless devices in a wireless personal area network (WPAN), wherein each of the two or more wireless devices has a regulation setting associated with a corresponding region, said regulation setting defining a frequency band within which the wireless device from the corresponding region is configured to operate, the method comprising:
    upon initialization of one wireless device of the two or more wireless devices that has a regulation setting different from another wireless device of the two or more wireless devices, scanning a common channel defined as available for initiating communication among wireless devices from different regions according to regulations of the different regions;
    forming a network between the one wireless device with the remaining devices of the two or more wireless devices communicating over the common channel, wherein the wireless devices in the network belong to the WPAN;
    selecting a WiNet service set (WSS) channel based, in part, on the regulation settings of the two or more wireless devices in order to form a WSS among the two or more wireless devices;
    upon switching of the two or more wireless devices to the WSS channel, checking if a new wireless device attempts to join the WSS; and
    adding the new wireless device to the WSS if such attempt was detected, wherein the new wireless device is configured with regulation settings that are different from regulation settings of at least one wireless device in the WSS to enable communication compatibility of wireless devices configured with different regulation settings.

2. The method of claim 1, wherein the common channel is a channel in an available regulated band group, wherein the available regulated band group is a frequency band group on which wireless devices from a same region communicate with each other.

3. The method of claim 1, wherein forming the WSS further comprises:
    exchanging regulation settings between the two or more wireless devices about frequency band groups allowed in the respective region of each said wireless device;
    determining a set of allowable common channels based on the regulation settings of the two or more wireless devices; and
    scanning the channels in the set of allowable common channels to detect one allowable common channel on which the two or more wireless devices can communicate; and
    wherein the selecting further comprises establishing the WSS on the detected allowable common channel, wherein the detected allowable common channel is the WSS channel.

4. The method of claim 1, wherein the channels in the set of allowable common channels are scanned simultaneously.

5. The method of claim 4, wherein checking if the new wireless device attempts to join the WSS further comprises:
    selecting one wireless device from the WSS to periodically transmit beacons in the common channel; and
    listening to the common channel to detect a superframe transmitted by the new wireless device.

6. The method of claim 5, wherein adding the new device to the WSS further comprises:
    exchanging the regulation settings between the new wireless device and the one wireless device transmitting the beacon in the common channel;
    sending the regulation setting of the new wireless device to all wireless devices in the WSS; and
    communicating information about the WSS to the new wireless device in order to add the new wireless device to the WSS when the wireless devices in the WSS and the new wireless device can communicate on the WSS channel.

7. The method of claim 6, further comprising:
    scanning for a new common channel that the new wireless device and the wireless devices in the WSS can communicate on; and
    upon detecting the new common channel, switching the new wireless device and the wireless devices to the detected new common channel, thereby forming a new WSS on a new WSS channel.

8. The method of claim 1, further comprising explicitly enabling blocked wireless devices to join a WSS, wherein a blocked wireless device is a device that was previously blocked from joining a WSS.

9. The method of claim 1, wherein the wireless devices in the WSS are at least ultra-wideband (UWB) devices operating in the WPAN, wherein the WPAN is a WiMedia network.

10. The method of claim 9, wherein each of the wireless devices manufactured in different regions can operate only in frequency band groups regulated for the respective region.

11. A non-transitory computer readable medium having stored thereon computer executable code, which, when executed, causes a processor or a computer to perform a method for enabling compatibility of communications between two or more wireless devices in a wireless personal area network (WPAN), wherein each of the two or more wireless devices has a regulation setting associated with a corresponding region, said regulation setting defining a frequency band within which the wireless device from the corresponding region is configured to operate, the method comprising:
    upon initialization of one wireless device of the two or more wireless devices that has a regulation setting different from another wireless device of the two or more wireless devices, scanning a common channel defined as available for initiating communication among wireless devices from different regions according to regulations of the different regions;

forming a network between the one wireless device with the remaining devices of the two or more wireless devices communicating over the common channel, wherein the wireless devices in the network belong to the WPAN;

selecting a WiNet service set (WSS) channel selected based, in part, on the regulation settings of the two or more wireless devices in order to form a WSS among the two or more wireless devices;

upon switching of the two or more wireless devices to the WSS channel, checking if a new wireless device attempts to join the WSS; and adding the new wireless device to the WSS if such attempt was detected, wherein the new wireless device is configured with regulation settings that are different from regulation settings of at least one wireless device in the WSS to enable communication compatibility of wireless devices configured with different regulation settings.

12. A first wireless device operable for enabling compatibility of communications between one or more other wireless devices in a distributed wireless personal area network (WPAN), wherein each wireless device has a regulation setting associated with a corresponding region, said regulation setting defining a frequency band within which the wireless device from the corresponding region is configured to operate, the first wireless device comprising:

a radio transceiver configured to receive and transmit radio signals over a wireless medium;

a processor; and a memory for storing instructions that, when executed, configure the processor to:

scan, upon initialization of the first wireless device that has a regulation setting different from the one or more other wireless devices, a common channel defined as available for initiating communication among wireless devices from different regions according to regulations of the different regions;

form a network between the first wireless device with the one or more other wireless devices communicating over the common channel, wherein the wireless devices in the network belong to the WPAN;

select a WiNet service set (WSS) channel based, in part, on the regulation settings of the first wireless device and the one or more other wireless devices in order to form a WSS among the first wireless device and the one or more other wireless devices;

check, upon switching of the wireless devices to the WSS channel, if a new wireless device attempts to join the WSS; and add the new wireless device to the WSS if such attempt was detected, wherein the new wireless device is configured with regulation settings that are different from regulation settings of at least one wireless device in the WSS to enable communication compatibility of wireless devices configured with different regulation settings.

* * * * *